United States Patent [19]

Newby et al.

[11] Patent Number: 5,148,453
[45] Date of Patent: Sep. 15, 1992

[54] PARALLEL SYNC DETECTION

[75] Inventors: Paul S. Newby, Toronto; Wayne H. Cannon, Nobbleton, both of Canada

[73] Assignee: The Institute for Space and Terrestrial Science, North York, Canada

[21] Appl. No.: 694,986

[22] Filed: May 2, 1991

[51] Int. Cl.$^5$ .............................................. H04L 7/00
[52] U.S. Cl. .................................. 375/116; 370/105.4
[58] Field of Search ............... 375/106, 112, 114, 116; 370/105.4, 106; 328/63, 75; 340/825.2, 825.14; 364/728

[56] References Cited

U.S. PATENT DOCUMENTS

| | | | |
|---|---|---|---|
| 4,506,372 | 3/1985 | Massey et al. | 364/728 |
| 4,636,583 | 1/1987 | Bidell et al. | 375/114 |
| 4,802,192 | 1/1989 | Eto et al. | 375/116 |
| 4,847,869 | 7/1989 | Labedz et al. | 375/114 |
| 4,984,238 | 1/1991 | Watanabe et al. | 375/116 |
| 5,016,206 | 5/1991 | Shinonaga | 375/116 |

Primary Examiner—Stephen Chin
Attorney, Agent, or Firm—Davis & Schroeder

[57] ABSTRACT

A parallel sync circuit comprising a serial-to parallel converter for converting an input serial into a corresponding parallel signal, a phase detector for detecting possible phase of a sync word in the parallel signal and generating a phase signal responsive thereto, a sync word generator for receiving the phase signal and in response generating a phase shifted stored version of the sync word, and a correlator for comparing the parallel signal to the phase shifted stored version of the sync word and in the event of substantial identity therebetween generating an output signal for indicating detection of the sync word.

9 Claims, 3 Drawing Sheets

PARALLEL SYNC DETECTION

TECHNICAL FIELD

This invention relates in general to digital signal receivers, and more particularly to a parallel sync detector for detecting sync words in a serial data signal.

BACKGROUND ART

Format synchronization in serial data links is generally obtained through the periodic insertion of sync words in the data format. Recognition of the sync word at the output of the data receiver is required in order to obtain bit level synchronization for synchronous decoding of the data.

Turning to FIG. 1, a conventional sync detector is shown for detecting an M-bit sync word within a serial input signal.

A serial data signal is clocked into an M-bit shift register 1 under control of a serial clock signal synchronized to the data signal. Successive bits appearing on the outputs of shift register 1 are compared within a correlator 2 to corresponding bits ($S_1, S_2 \ldots S_M$) of the M-bit sync word stored within template register 3.

The correlator 2 performs a multiplication of respective pairs of signals output from the shift register 1 and sync word template 3 via multipliers $X_1, X_2 \ldots X_M$. Respective outputs of the multipliers $X_1, X_2 \ldots X_M$ are applied to the inputs of a summer 4. The output of summer 4 is applied to one input of a comparator 5, and a second input of a comparator receives a threshold signal having a value of M-T, where T designates a threshold number of acceptable errors in the received sync word.

In operation, comparator 5 generates a one bit output signal having a logic high value when the output value from summer 4 exceeds M-T, and a logic low value otherwise. In other words, if the number of agreements between the stored input data signal within shift register 1 and the sync word generated from template 3 exceeds the aforementioned threshold M-T, the sync word is considered to have been detected.

The correlator 2 may be implemented in either analog or digital form (e.g. multipliers $X_1, X_2 \ldots X_M$, summer 4, and comparator 5 may be either analog or digital circuits). However, the output of comparator 5 should be a binary value.

The primary limitation of the above discussed prior art sync detector is that the input data signal is processed serially, which for high data rates results in a requirement for high speed, high power and complexity of circuitry.

BRIEF DESCRIPTION OF DRAWINGS

A brief description of prior art sync detectors will be provided herein below along with a description of the preferred embodiment of the present invention, with reference to the following drawings, in which.

DISCLOSURE OF INVENTION

In accordance with the present invention, a sync detector is provided which operates on an input signal at a fraction of the data rate of the input signal itself, resulting in low power and complexity of implementation.

In accordance with an aspect of the present invention, there is provided a parallel sync detection circuit comprising means for converting an input serial signal into a parallel signal, means for detecting possible phase of a sync word in said parallel signal and generating a phase signal responsive thereto, means for receiving said phase signal and in response generating a stored version of said sync word phase shifted in accordance with said phase signal, and a correlator for comparing said parallel signal to said phase shifted stored version of said sync word and in the event of substantial identity therebetween generating an output signal for indicating detection of said sync word.

In accordance with another aspect of the present invention, there is provided a circuit for detecting a digital sync word of M bits in a serial signal, comprising:

a) means for receiving and converting said serial signal into a parallel signal having N bits; where M = KN, and K is an integer;
b) means for storing K + 1 successive N-bit sequences of said parallel signal;
c) means for detecting phase location of said digital sync word in said K + 1 successive N-bit sequences, and generating a digital phase signal responsive thereto;
d) means for receiving said digital phase signal and in response generating a phase shifted correct version of said digital sync word; and
e) means for receiving and comparing KN of said K + 1 successive N-bit sequences in parallel to said phase shifted correct version of said digital sync word, and in the event said N-bit sequences of said parallel signal correlate with said correct version of said digital sync word then generating an output signal indicative of detection of said sync word in said serial signal.

BEST MODE OF CARRYING OUT THE INVENTION

Figure 2:
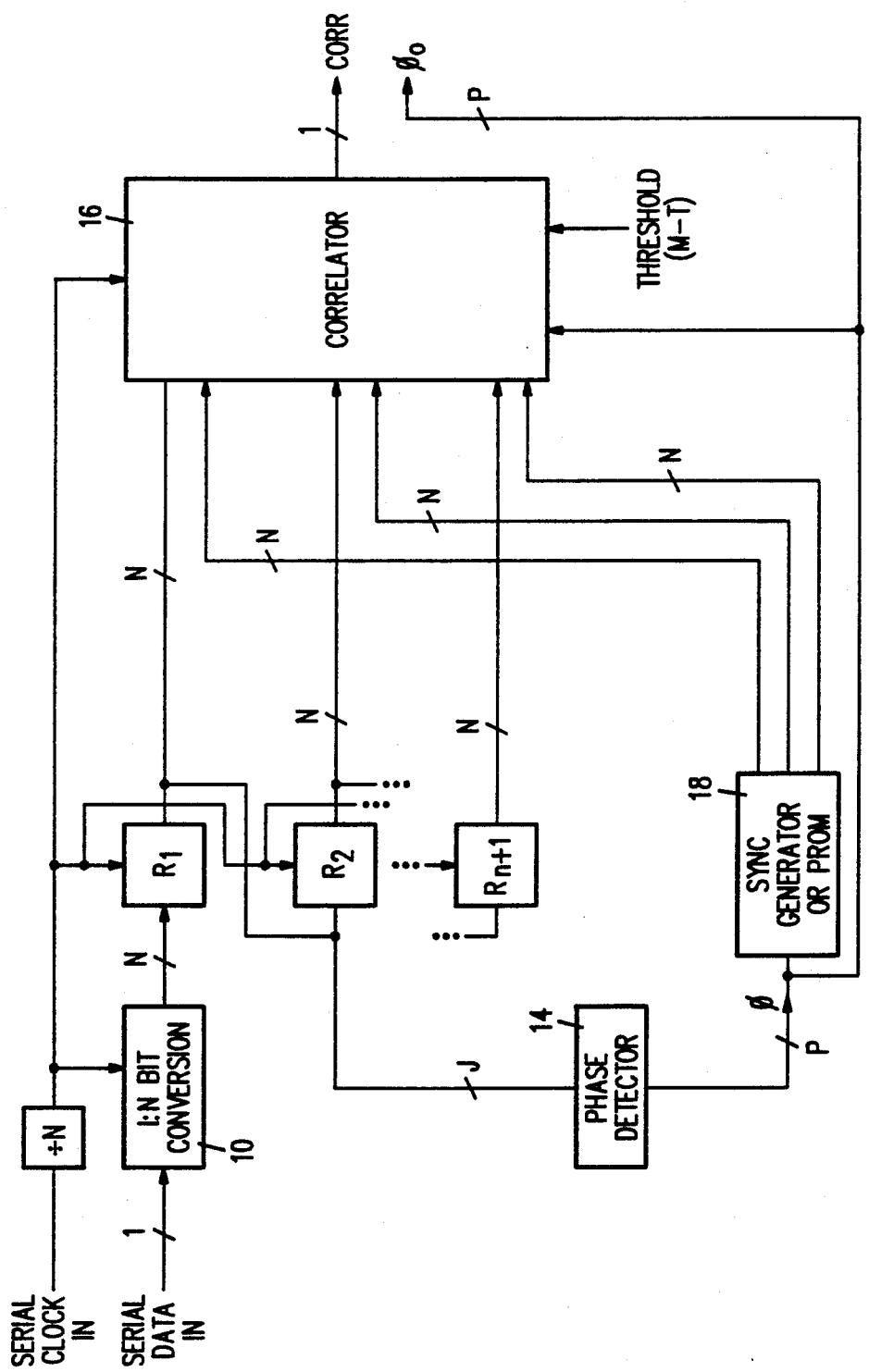
FIG. 2 is a block schematic diagram of a parallel sync detector in accordance with the preferred embodiment of the present invention.

Turning to FIG. 2, a parallel sync detector is shown in accordance with the preferred embodiment comprising a serial-to-parallel converter 10 having a clock input connected to a clock divider 12.

In operation, the input serial clock signal is divided by N in divider 12 for clocking out respective N-bit parallel segments of the digital serial input signal from converter 10.

The number of bits N in the parallel signal is chosen such that M = KN, where M is the number of bits in the sync word to be detected, and K is an integer.

Successive N-bit segments of the parallel signal are loaded into respective N-bit registers $R_1, R_2 \ldots R_{K+1}$. As shown in FIG. 2, the inputs of register $R_1$ are connected to the serial-to-parallel converter 10 for receiving successive N-bit parallel signal segments of the digital serial input signal. The N-bit outputs of register $R_1$ are connected to corresponding inputs of register $R_2$, and the outputs of register $R_2$ are connected to corresponding inputs of a subsequent register (e.g. $R_3$), etc. Respective N-bit segments are loaded into the registers $R_1, R_2 \ldots R_{K+1}$ under control of the divided clock signal output from divider 12.

Figure 1:
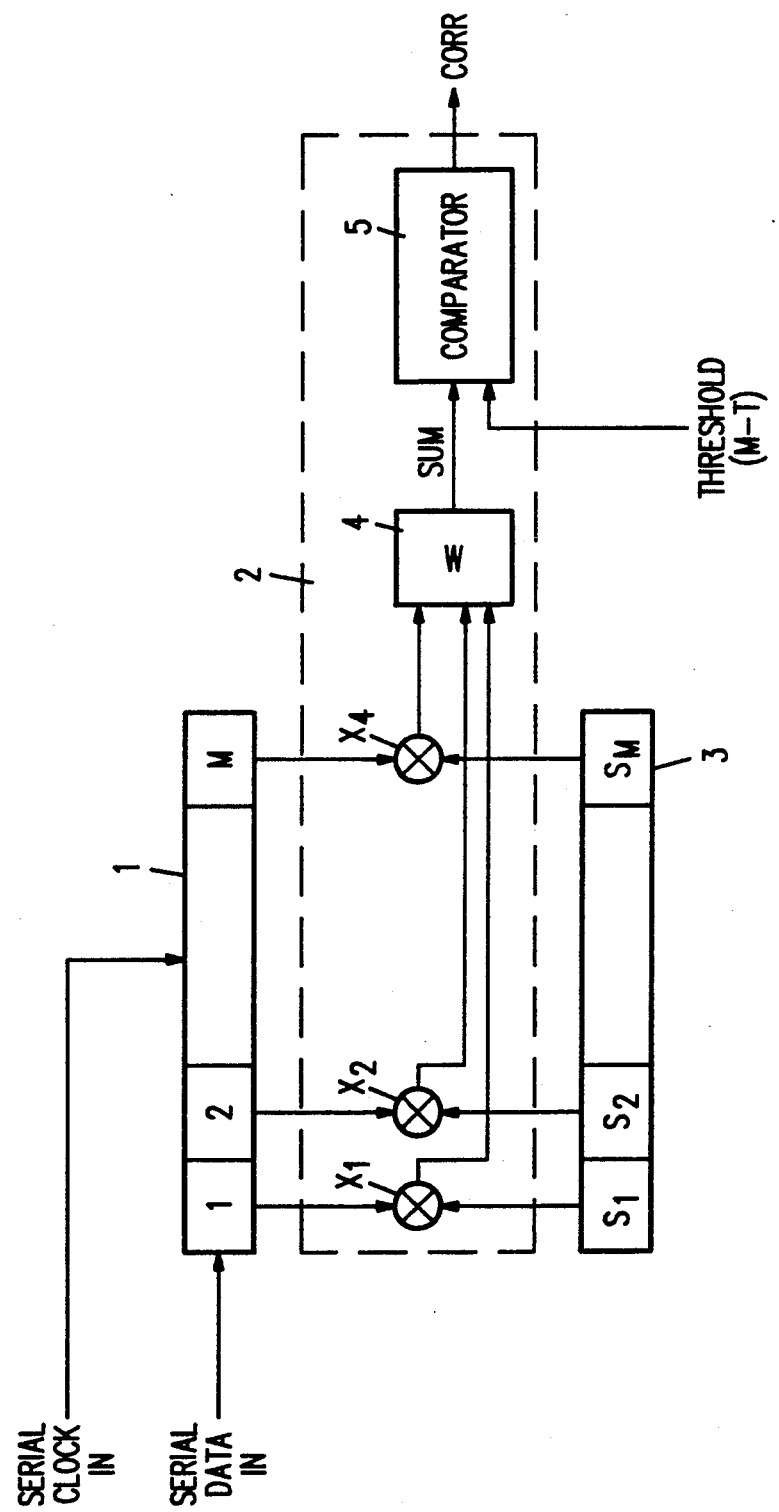
FIG. 1 is a schematic block diagram of a conventional sync detector in accordance with the prior art.

In accordance with the present invention, for an M-bit sync word, a predetermined minimum number of bits (J(min)) are required to identify the phase of the sync word at the receiver. In this regard, a phase detector 14 is connected to predetermined outputs of various one or more of the registers $R_1, R_2 \ldots R_{K+1}$ for receiving J bits of the (K+1)N-bit parallel signal segment. Although the J bits are depicted in FIG. 1 as being received from register $R_1$, the J bits can, in fact, be selected from any one or plurality of individual outputs of the registers $R_1, R_2 \ldots R_{K+1}$.

Upon deciding on the bits J and which of the register outputs these bits are to be obtained from, a constraint is placed on the sync word such that there are N unique sequences of J bits for identifying the phase. Thus, for a J-bit "snap shot" of the (K+1)N-bit segment of incoming signal, a minimum of J(min) bits are required to positively identify the phase of the sync word within the input signal. Of course, in normal usage, various J-bit patterns appear in the serial data signal which do not form part of the sync word. Thus, phase detector 14 functions as a necessary but not sufficient means for detecting the presence of a sync word, while the correlator 16 performs the ultimate determination.

The minimum number of bits required to identify the phase of the sync word within K+1 N-bit consecutive segments of input data may be represented by P, where $2^P = N$ and $J(min) >= P$ (assuming T=O, where T is the number of errors allowed in the received sync word).

In general, the minimum number of bits required to identify the phase of a sync word in the presence of up to T errors is J(min)=P+2T. This follows from the principles of digital information theory which dictate that the actual minimum number of bits J(min) is determined by the requirement that there must be N consecutive segments of J bits in the sync word, each segment having a Hamming distance of P+2T from each other segment.

For example, if a 16 bit sync word is used (M=16), and if N=8 (byte wide detection), then a minimum number of 3 bits (e.g. J(min)=3) are required to determine the location of the sync word in (K+1)=3 consecutive bytes of data. If one error is to be allowed in the detection of the sync word (e.g. T=1), then at least J(min)=P+2T=3+2×1=5 bits are required to identify the phase of the sync word.

Phase detector 14 can be in the form of a look-up table for comparing the input J bits with a predetermined template, or can be in the form of a digital mapping (e.g. programmable logic array) for generating the P-bit phase signal upon receipt of the appropriate bit pattern within the input signal.

The P-bit designation of sync word phase is output from phase detector 14 and applied to a sync word generator 18 which, according to the preferred embodiment, is implemented as a PROM. In response, sync word generator 18 generates a (K+1)N-bit digital signal in which the phase location of the M bit sync word is determined by the value of P.

Respective N-bit segments of the phase shifted sync word are compared to successive N-bit segments of the parallel input signals output from registers $R_1, R_2 \ldots R_{K+1}$. The P-bit phase signal output from detector 14 is also applied to correlator 16 such that correlator effectively masks the bits surrounding the phase shifted sync word output from generator 18, as well as the corresponding data bits output from registers $R_1$ and $R_{K+1}$.

In all other respects, the correlator 16 operates in an identical manner to the correlator 2 discussed above with reference to the prior art detector of FIG. 1.

Thus, in operation, correlator 16 receives a threshold input signal (M-T) and generates a logic high correlator output signal in the event that the received parallel converted input signal from registers $R_1, R_2 \ldots R_{K+1}$ is substantially identical to the stored sync word output from generator 18 (exception being made for up to T errors).

In addition to the one bit output signal from correlator 16, the parallel sync detector of the present invention also provides an indication of the P-bit phase signal.

Thus, as discussed above, the circuit of the present invention generates an accurate detection of sync words at a fraction 1/N of the input serial data rate. Accordingly, substantial savings are effected in complexity, cost and power implementation requirements over prior art serial sync detectors.

Figure 3:
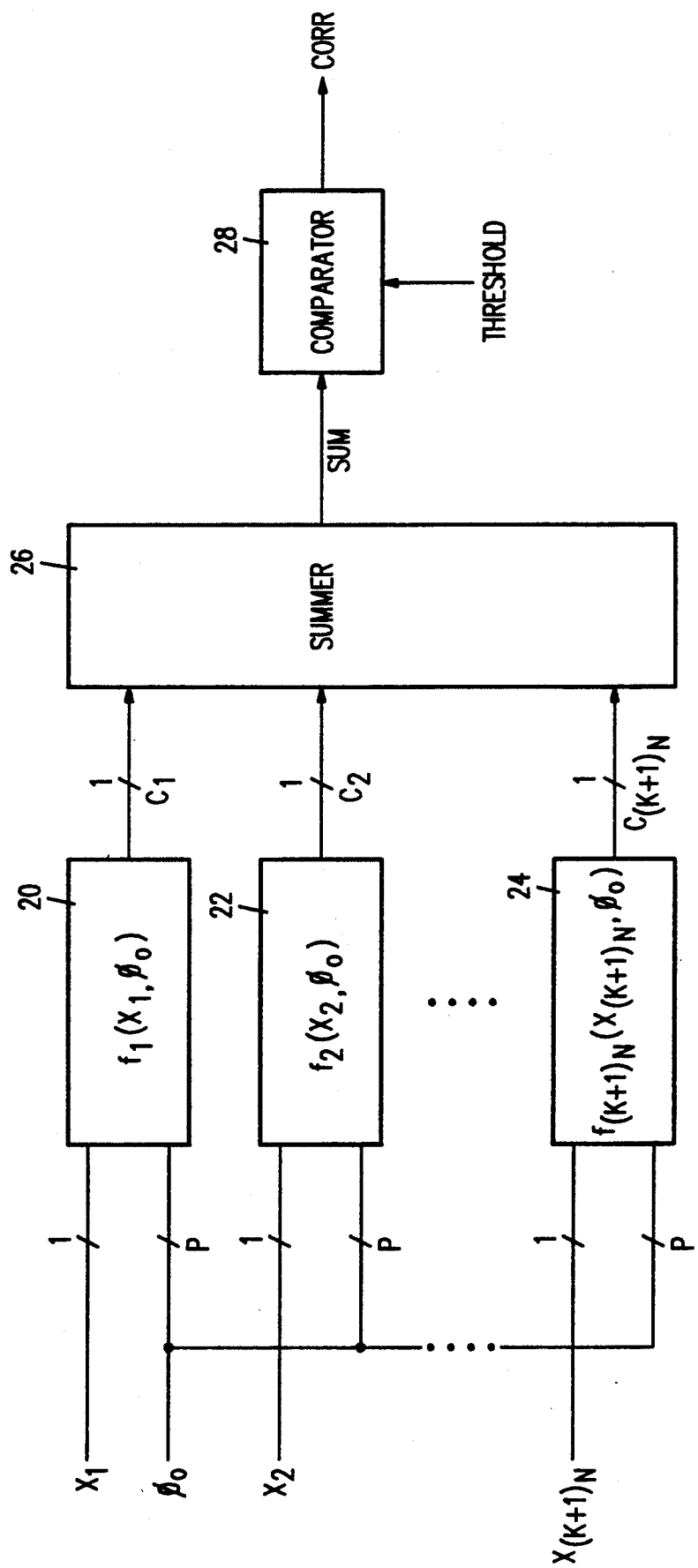
FIG. 3 is a block schematic diagram of an alternative design of correlator for use in the sync detector of the present invention.

FIG. 3 illustrates an alternative means of correlating the (K+1)N bits from the register outputs (here labelled $X(1), X(2), \ldots X((K+1)N)$) as determined by the P bits of phase detector 14 (FIG. 2).

More particularly, logical circuit elements or blocks 20, 22 ... 24 are provided for effecting respective arbitrary mappings of P+1 bits to 1 bit. The mappings are represented by $f_1(X_1, \phi_O)$, $f_2(X_2, \phi_O) \ldots f_{(K+1)N}(X_{(K+1)N}, \phi_O)$. The logical circuit blocks 20, 22 ... 24 may be implemented by programmable logic devices such as PLA'S, etc.

In operation, the P bits of phase detector output identify X(i) as one of KN possible sync bits or one or N maskable data bits. If X(i) is a possible sync bit and is the same value as the sync bit identified, the output of the logical block (e.g. block 20, 22 ... 24) is C(i)=1. Otherwise, C(i)=0 if X(i) is a possible sync bit and is not the same value as the sync bit identified, or X(i) is a maskable data bit.

The (K+1)N outputs of logical blocks 20, 22 ... 24 are summed via summer 26 for comparison against the correlator threshold in comparator 28, as occurs in the above-discussed prior art.

The alternative embodiment of FIG. 3 is functionally the same as the preferred embodiment illustrated in FIG. 2, but does not include the explicit formation of sync and mask bits for input to a conventional correlator.

Variations and modifications of the present invention are possible within the sphere and scope of the invention as defined by the claims appended hereto.

We claim:

1. A signal for detecting a digital sync word of M bits in a serial signal, comprising:
   a) means for receiving and converting said serial signal into a parallel signal having N bits; where M=KN, and K is an integer;
   b) means for storing K+1 successive N-bit sequences of said parallel signal;
   c) means for detecting phase location of said digital sync word in said K+1 successive N-bit sequences, and generating a digital phase signal responsive thereto;
   d) means for receiving said digital phase signal and in response generating a phase shifted correct version of said digital sync word; and e) means for receiving and comparing KN of said K+1 successive N-bit sequences in parallel to said phase shifted correct version of said digital sync word, and in the event said N-bit sequences of said parallel signal correlate with said correct version of said digital sync word then generating an output signal indicative of detection of said sync word in said serial signal.

2. The circuit of claim 1, wherein said means for receiving and converting said serial signal into said parallel signal comprises a 1: N-bit serial-to-parallel converter.

3. The circuit of claim 2, wherein said means for storing comprises K+1 N-bit registers, a first one of said registers having input terminals thereof connected to said serial-to-parallel converter and output terminals thereof connected to the input terminals of a second one of said registers, and successive ones of said K+1 registers being connected in series.

4. The circuit of claim 2, wherein said means for detecting comprises a phase detector for receiving a predetermined number of bits of said parallel signal and in response generating said digital phase signal, wherein said predetermined number of bits is J, and said phase signal comprises P-bits, where $2^P=N$ and the minimum value of J for detecting said phase location is given by $J(min)=P+2T$, where T represents a predetermined number of bits permitted to be in error within the received sync word.

5. The circuit of claim 4, wherein said means for receiving said digital phase signal and in response generating said phase shifted correct version of said digital sync word comprises a look-up table.

6. The circuit of claim 5, wherein said look-up table is incorporated within a PROM.

7. The circuit of claim 5, wherein said means for receiving and comparing comprises a correlator having K+1 pairs of N-bit inputs for receiving and comparing said K+1 successive N-bit sequences to respective N-bit sequences of said phase shifted correct version of said digital sync word, and in the event of fewer than M-T differences therebetween generating said output signal.

8. The circuit of claim 7, wherein said correlator further includes means for masking N bits of said parallel signal and said phase shifted correct version of said digital sync word which are not within the boundaries of the said sync word.

9. A parallel sync detection circuit comprising means for converting an input serial signal into a parallel signal, means for detecting possible phase of a sync word in said parallel signal and generating a phase signal responsive thereto, means for receiving said phase signal and in response generating a stored version of said sync word phase shifted in accordance with said phase signal, and a correlator for comparing said parallel signal to said phase shifted stored version of said sync word and in the event of substantial identity therebetween generating an output signal for indicating detection of said sync word.

* * * * *

UNITED STATES PATENT AND TRADEMARK OFFICE
CERTIFICATE OF CORRECTION

PATENT NO.  : 5,148,453
DATED       : September 15, 1992
INVENTOR(S) : Paul S. Newby and Wayne H. Cannon It is certified that error appears in the above-identified patent and that said Letters Patent is hereby corrected as shown below:

Column 4,
In Claim 1, line 1, delete "A signal", and substitute therefor -- A circuit --.

Signed and Sealed this

Eighteenth Day of July, 1995

Attest:

BRUCE LEHMAN

Attesting Officer

Commissioner of Patents and Trademarks